(12) United States Patent
Wu et al.

(10) Patent No.: US 10,263,844 B1
(45) Date of Patent: Apr. 16, 2019

(54) TECHNIQUES FOR PERFORMING AN UPGRADE

(71) Applicant: EMC IP Holding Company LLC, Hopkinton, MA (US)

(72) Inventors: Jun Wu, Shanghai (CN); Minqiang Wu, Shanghai (CN); Wei Wang, Westborough, MA (US)

(73) Assignee: EMC IP Holdiing Company LLC, Hopkinton, MA (US)

( * ) Notice: Subject to any disclaimer, the term of this patent is extended or adjusted under 35 U.S.C. 154(b) by 0 days.

(21) Appl. No.: 15/654,244

(22) Filed: Jul. 19, 2017

(51) Int. Cl.
*G06F 9/44* (2018.01)
*H04L 12/24* (2006.01)
*G06F 8/654* (2018.01)
*G06F 8/656* (2018.01)

(52) U.S. Cl.
CPC ............ *H04L 41/082* (2013.01); *G06F 8/654* (2018.02); *G06F 8/656* (2018.02)

(58) Field of Classification Search
None
See application file for complete search history.

(56) References Cited

U.S. PATENT DOCUMENTS

| | | | |
|---|---|---|---|
| 8,938,731 B2* | 1/2015 | Valentine | H04L 67/34 717/173 |
| 2011/0239208 A1* | 9/2011 | Jung | G06F 8/65 717/170 |

OTHER PUBLICATIONS

EMC® VNX® release notes 1, VNX Operating Environment for Block 05.33.008.5.119 VNX Operating Environment for File 8.1.8.121 EMC Unisphere 1.3.8.1.0119, Oct. 2015, Automatic notification of new firmware updates.
EMC® VNX® release notes 2, VNX Operating Environment for Block 05.33.009.5.155, VNX Operating Environment for File 8.1.9.155, EMC Unisphere 1.3.9.1.155, Mar. 2016, Disk firmware auto update.

* cited by examiner

*Primary Examiner* — Qamrun Nahar
(74) *Attorney, Agent, or Firm* — Muirhead and Saturnelli, LLC

(57) ABSTRACT

Techniques for performing an upgrade may include: receiving notification regarding an occurrence of a trigger event in a system, wherein the trigger event is included in a set of one or more defined trigger events, and wherein the set includes one or more defined time periods; and responsive to receiving the notification, performing first processing including: collecting configuration information describing a current configuration of the system, wherein the configuration information includes data storage device information identifying particular data storage devices in the system, a current version of software on the system, and a current version of firmware for a particular type of data storage device in the system; and performing proactive analysis of the configuration information that determines whether to recommend performing an upgrade to the firmware.

18 Claims, 4 Drawing Sheets

| Storage Device Type | Firmware Version | Storage Software Version 1 | Storage Software Version 2 | Storage Software Version 3 | Storage Software Version 4 |
|---|---|---|---|---|---|
| Vendor 1 Type 1 | Version 1 | Compatible & Normal 232a | Incompatible & NA 234a | Compatible & Normal 236a | Compatible & Normal 238a |
| Vendor 1 Type 1 | Version 2 | Compatible & Critical 232b | Compatible & Normal 234b | Compatible & Critical (Recommended) 236b | Compatible & Critical (Recommended OPTION 1) 238b |
| Vendor 1 Type 1 | Version 3 | Compatible & Critical (Recommended) 232c | Compatible & Normal (Recommended) 234c | Incompatible & NA 236c | Compatible & Normal (Recommended OPTION 2) 238c |

FIG. 3

TECHNIQUES FOR PERFORMING AN UPGRADE

BACKGROUND

Technical Field

This application generally relates to performing an upgrade such as may be used in connection with upgrading of storage device firmware.

Description of Related Art

Systems may include different resources used by one or more host processors. Resources and host processors in the system may be interconnected by one or more communication connections, such as network connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. These may or may not correspond to the actual physical drives. Allowing multiple host systems to access the single data storage system allows the host systems to share data stored therein.

SUMMARY OF THE INVENTION

In accordance with one aspect of the techniques herein is a method of performing an upgrade comprising: receiving notification regarding an occurrence of a trigger event in a system, wherein the trigger event is included in a set of one or more defined trigger events, and wherein the set includes one or more defined time periods; and responsive to receiving the notification, performing first processing including: collecting configuration information describing a current configuration of the system, wherein the configuration information includes data storage device information identifying particular data storage devices in the system, a current version of software on the system, and a current version of firmware for a particular type of data storage device in the system; and performing proactive analysis of the configuration information that determines whether to recommend performing an upgrade to the firmware. If it is determined to recommend performing an upgrade to the firmware, the method may also include providing a user notification regarding a recommended upgrade to the firmware. The user notification may include information identifying a target version of the firmware recommended for installation on a data storage device of the particular type. The method may include receiving a user input indicating to perform the recommended upgrade to the firmware; and responsive to receiving the user input, performing processing including upgrading the firmware on system for the particular type of data storage device to the target version recommended. The system may be a data storage system. The software on the system may include any of an operating system and microcode installed on the data storage system. The proactive analysis of the configuration information may further comprise determining a target version of the firmware recommended in accordance with the current version of software in the system and the current version of firmware for the particular type of data storage device in the system. The method may also include determining whether the target version of the firmware is a later release than the current version of firmware for the particular type of data storage device in the system; and if it is determined that the target version is a later release than the current version of firmware for the particular type of data storage device in the system, providing a user notification regarding a recommendation to upgrade the firmware to the target version. The proactive analysis of the configuration information may further comprise determining a plurality of recommended upgrade options includes a first option and a second option. The first option may be to upgrade to a first version of the firmware that is compatible with the current version of software in the system and wherein the first version may be a critical upgrade of the firmware. The second option may be to upgrade to a second version of the firmware that is a later release that the first version of the firmware, and wherein the second version may be compatible with the current version of software in the system and is a non-critical upgrade of the firmware. The current version of firmware may be an earlier release of the firmware prior to both the first version of the firmware and the second version of the firmware. The first version that is a critical upgrade of the firmware may be a required upgrade and may include one or more critical corrections for known problems. The second version that is a non-critical upgrade of the firmware may be an optional upgrade and may include support for a new feature. The new feature may include any of: support for a new processor and support for a power saving enhancement. The set of one or more defined trigger events may further include at least one of: adding a storage device to the system, a user initiated trigger using a user interface, issuing a command or request via a command line interface, and selecting a user interface element from a graphical user interface.

In accordance with another aspect of the techniques herein is a system comprising: at least one processor; and a memory comprising code stored thereon that, when executed, performs a method of upgrading firmware comprising: receiving notification regarding an occurrence of a trigger event in a system, wherein the trigger event is included in a set of one or more defined trigger events, and wherein the set includes one or more defined time periods; and responsive to receiving the notification, performing first processing including: collecting configuration information describing a current configuration of the system, wherein the configuration information includes data storage device information identifying particular data storage devices in the system, a current version of software on the system, and a current version of firmware for a particular type of data storage device in the system; and performing proactive analysis of the configuration information that determines whether to recommend performing an upgrade to the firmware.

In accordance with another aspect of techniques herein is a computer readable medium comprising code stored thereon that, when executed, performs a method of upgrading firmware comprising: receiving notification regarding an occurrence of a trigger event in a system, wherein the trigger event is included in a set of one or more defined trigger events, and wherein the set includes one or more defined time periods; and responsive to receiving the notification, performing first processing including: collecting configuration information describing a current configuration of the system, wherein the configuration information includes data storage device information identifying particular data storage devices in the system, a current version of software on the system, and a current version of firmware for a particular type of data storage device in the system; and performing proactive analysis of the configuration information that determines whether to recommend performing an upgrade to the firmware. If it is determined to recommend performing an upgrade to the firmware, the method may also include providing a user notification regarding a recommended upgrade to the firmware. The user notification may include information identifying a target version of the firmware recommended for installation on a data storage device of the particular type. The method may include receiving a user input indicating to perform the recommended upgrade to the firmware; and responsive to receiving the user input, performing processing including upgrading the firmware on system for the particular type of data storage device to the target version recommended.

BRIEF DESCRIPTION OF THE DRAWINGS

Features and advantages of the present invention will become more apparent from the following detailed description of exemplary embodiments thereof taken in conjunction with the accompanying drawings in which:

FIG. 3 is an example of information that may be included in the storage device firmware qualification database in an embodiment in accordance with techniques herein.

DETAILED DESCRIPTION OF
EMBODIMENT(S)

Figure 1:
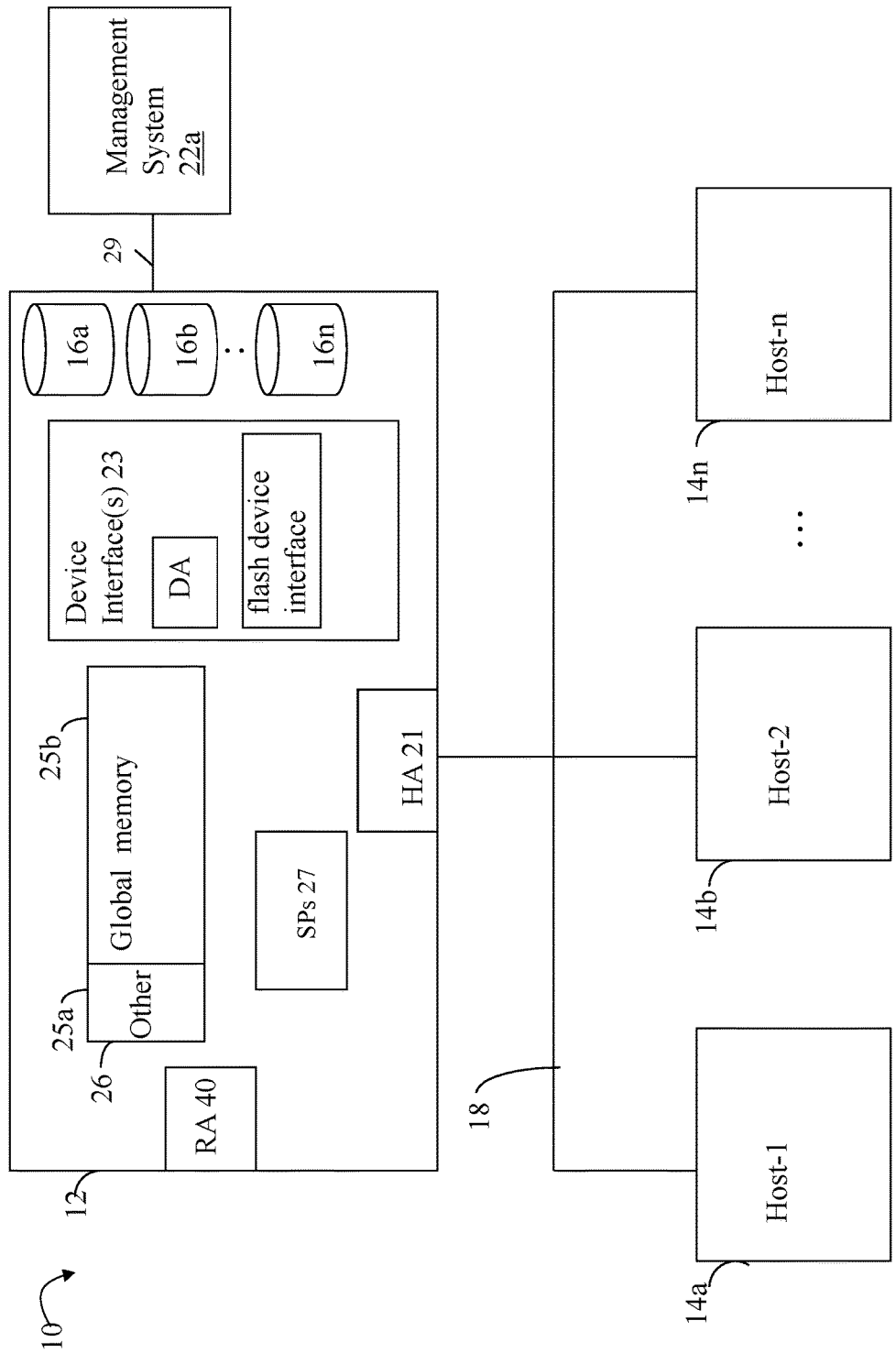
FIG. 1 is an example of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication connection 18. In this embodiment of the computer system 10, and the n hosts 14a-14n may access the data storage system 12, for example, in performing input/output (I/O) operations or data requests. The communication connection 18 may be any one or more of a variety of networks or other type of communication connections as known to those skilled in the art. The communication connection 18 may be a network connection, bus, and/or other type of data link, such as a hardwire or other connections known in the art. For example, the communication connection 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication connection 18 by any one of a variety of connections as may be provided and supported in accordance with the type of communication connection 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication connection that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication connection 18 may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of physical data storage devices (PDs or physical devices) such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include one or more SLC (single level cell) devices and/or MLC (multi level cell) devices.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation.

Also shown in FIG. 1 is a management system 22a that may be used to manage and monitor the system 12. In one embodiment, the management system 22a may be a computer system, or other device as described in more detail elsewhere herein, where such system or device 22a includes data storage system management software or application such as may execute in a web browser. The system 22a may communicate with the data storage system 12 over any suitable connection 29. Generally, element 29 may be a network connection such as a public internet connection, private intranet connection, and the like. Element 29 may, for example, be any suitable connection similar to the connection 18 described elsewhere herein.

A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

Each of the different adapters, such as HA 21, DA or disk interface, RA, and the like, may be implemented as a hardware component including, for example, one or more processors, one or more forms of memory, and the like. Code may be stored in one or more of the memories of the component for performing processing.

An embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI or block-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to FIG. 1, the control commands may be issued from data storage management software executing on management system 22a to the data storage system 12. Such commands may be, for example, to establish or modify data services, provision storage, perform user account management, create a new logical entity (e.g., RAID group, storage pool), view information on physical and/or logical data entities in a current data storage system configuration (e.g., status and health of physical storage devices, amount of free/available storage in a provisioned LUN, pool, or RAID group) and the like. For example, commands may be issued over the control path to provision storage for LUNs from a RAID group or storage pool (e.g., logically defined group of physical storage devices), create a snapshot of a LUN, file system, or other logical entity, define conditions of when to create another snapshot, delete a snapshot, define or establish local and/or remote replication services for a logical entity (e.g., file, file system, LUN), define or modify a schedule for snapshot or other data replication services, define/create a RAID group or storage group (e.g., configured from selected physical storage devices), obtain data storage management and configuration information for display, generally modify one or more aspects of a data storage system configuration, and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

A data storage system, such as a data storage array, may be manufactured and sold with embedded 3rd party disks, or more generally, data storage devices. Those storage devices have typically passed certification and usability standards, requirements and qualifications that may be specified by data storage system providers. Such certification and usability standards, requirements and qualifications may, for example, relate to aspects of usability and compatibility with data storage system hardware and software. Upgrading data storage device firmware to a new version non-disruptively for a storage customer is one example of a general use cases for storage device management and service. Disk firmware, or more generally storage device firmware, is generally known in the art as low-level code or instructions such as may be embedded or stored on each storage device, in the data storage system. Storage device firmware may be customized, specific to, or vary with, different storage device characteristics such as with each different device vendor and type of storage device. For example, the firmware may vary with each particular vendor as well as the different types of devices of a vendor.

In connection with storage device firmware upgrade, difficulties or problems may be experienced by users and customers. First, unlike the upgrading of software (e.g., such as microcode or operating system) installed on the data storage system, the storage device firmware is usually made by 3rd party vendor and is typically on its own release cycle which may not coincide with the data storage system's software release cycle. Some firmware versions may be identified as incompatible with particular storage system software versions and may cause potential problems even after releasing them to storage customers (e.g., the customer may end up having a version of storage device firmware installed that is incompatible with a currently installed version of the storage system software. Furthermore, some storage customers may not receive timely reminders or notifications when firmware upgrades become available for their particular storage devices. Additionally, determining the best suitable and compatible firmware version for other current data storage system hardware and software may be complex and difficult. To resolve the foregoing and other problems, techniques are described in following paragraphs for use in a data storage system that provide a systematic process and automation tool for performing storage device firmware assessments and upgrades.

In accordance with techniques herein described in following paragraphs, processing may be performed to proactively and periodically evaluate a current data storage system configuration, determine one or more compatible firmware versions of storage device firmware for the particular storage devices of the current data storage system configuration, determine whether any firmware upgrades for storage devices are needed, and then provide a recommendation regarding the specific target firmware version for the particular storage devices. Furthermore, the user may be automatically notified regarding the specific recommended firmware upgrade whereby the user may select to perform the recommended firmware upgrade.

Figure 2:
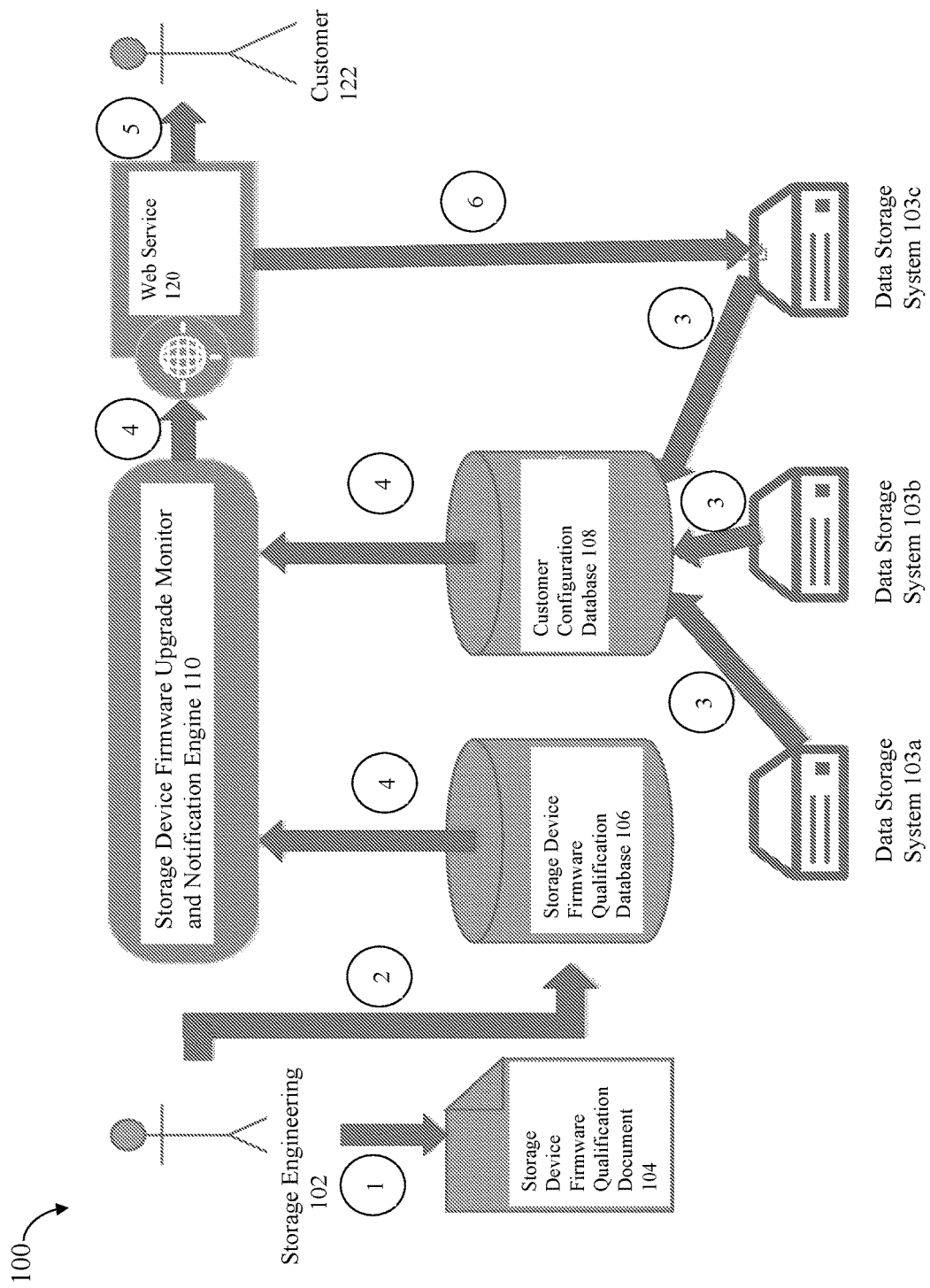
FIG. 2 is an example of components and associate work flow in an embodiment in accordance with techniques herein.

Referring to FIG. 2, shown is an example 200 of components and associated work flow that may be performed in an embodiment in accordance with techniques herein. In a first step, step 1, storage engineering 102 may determine a storage firmware qualification document 104. The document 104 may provide guidance to customers regarding the compatibility between various versions of storage device firmware and data storage system software. The document 104 may also identify the recommended upgrade progression or strategy between different versions of the firmware so that a customer may understand what is the most appropriate firmware for the particular storage devices in the customer's data storage system.

In a second step, step 2, storage engineering 102 may convert the storage device firmware qualification document 104 to a structured data format stored in the data storage firmware qualification database 106. In at least one embodiment, the fields of the database 106 may include:

Storage device type. In at least one embodiment described herein storage device type may further identify the particular storage device vendor and a particular type or model of the vendor.

Firmware version

Storage Software Version. In at least one embodiment described in examples herein, this may be listed as Storage Software Version 1, 2, 3.

Upgrade Recommendation Rate.

In at least one embodiment described herein, the upgrade recommendation rate may identify whether a particular pairing of storage software version and firmware version is Compatible or Incompatible, and may identify whether upgrading to a particular firmware version is characterized as Normal or Critical. In one aspect, Normal and Critical may define different ranked priorities assigned to a particular firmware version (thereby denoting a particular importance of priority of upgrading to that particular version from a lower or prior firmware version). 'Normal' means upgrading to a particular firmware version is optional, not required, or non-critical for storage customers. For example, a normal firmware version may be normal if it includes a new feature for a new type of processor or motherboard support, or an enhancement such as a power saving improvement for storage devices. With such normal firmware version, the storage customers may or may not want those updates. In contrast, 'Critical' means the upgrading to a particular firmware version is critical or required for storage customers. For example, a critical firmware version may include critical bug fixes, affect basic or core use and function of storage devices, relates to disk life improvement, and the like. Critical firmware version upgrades are deemed necessary and required for storage customers.

In following paragraphs and in FIG. 3 described below is an example of structured data that may be stored in the storage device firmware qualification database 106. To make it simple, the example data has only a single storage device type for a single vendor. However, in existing systems, there would likely be many additional storage device types.

In a third step, step 3, information is collected for the current storage configuration. As illustrated in FIG. 2, the current storage configuration data may be collected regarding the configurations of one or more data storage systems of a customer. For example, as illustrated in FIG. 2, the customer may have data storage systems 103a-c. Such configuration data may be collected in an automated manner by a software tool. The configuration data may include, for example, information regarding current hardware and software on the data storage system 103a-c. To further illustrate, the configuration data may include, for example, the current version of the storage system software (e.g., operating system, microcode) on each of the data storage systems 103a-c, may identify the different storage device types of the physical storage devices on each of the systems 103a-c, may identify the current firmware version of each of the different storage device types in systems 103a-c, and the like. In at least one embodiment, the collected current storage configuration data may be stored in the customer configuration database 108.

In at least one embodiment, the above-noted current storage configuration data may be collected periodically in an automated manner. For example, an embodiment may define a schedule for proactively collecting the configuration data of step 3 and then subsequently analyzing the collected configuration data in step 4 described below. In at least one embodiment, the collection of configuration information of step 3 may be performed as a background operation or task during periods of slow or idle CPU utilization.

In a fourth step, step 4, the storage device firmware upgrade monitor and notification engine 110 may analyze the customer's current storage configuration data collected (from step 3). Generally, using the information from the storage device firmware qualification database 106 and the customer configuration database 108 (storing the current storage configuration data), the engine 110 may determine a recommended firmware version for each particular storage device type of the customer's current storage configuration. Processing performed by the engine 110 may search the qualification database 106 for a firmware version and a storage system software version that match those versions associated with customer's current storage configuration (e.g., firmware version in database 106 that matches a current version of firmware of a particular storage device type in the current storage configuration, and storage system software version that matches a current version of storage system software in the current storage configuration data). Additionally, at least one recommended firmware version may be determined from the database 106 in accordance with (e.g., based on) the current version of storage system software in the current storage configuration data and the particular storage device type. The foregoing is described and illustrated in more detail below.

In a fifth step, step 5, if there is at least one recommended firmware version higher than the current version of the firmware (e.g., recommended firmware version is later or subsequent version than current version of firmware in configuration), then the customer 122 may be notified through Web Services 120 to perform the appropriate firmware upgrade to the recommended version. Such notification to the user may be provided in any suitable manner. For example, the user or customer 122 may be provided via email notification, through a graphical user interface (GUI) of the management software or application, and the like. In at least one embodiment, the customer 122 may receive a notification which identifies the recommended firmware version for the particular storage device type where the notification may include a button or other GUI element.

In a sixth step, step 6, the customer 122 may perform the upgrade operation such as by selecting the button or other GUI element. In at least one embodiment, responsive to the customer 122 selecting the button of the notification provided in step 5, the recommended firmware version may be downloaded and installed on the storage device of the customer's data storage system 103c (where the storage device has the particular storage device type associated with the recommended firmware version).

Referring to FIG. 3, shown is an example of information that may be stored in the storage device firmware qualification database 106. As noted above, for simplicity of illustration, the example 200 illustrates information that may be stored in the database 106 for a single storage device type. More generally, the database 106 may similarly include information for multiple firmware versions for multiple different storage device types. The example 200 includes the following columns: storage device type 202 firmware version 204, storage software versions 206 (e.g., versions of the operating system or microcode on the data storage system). Storage device type 202 may correspond to a particular storage device such as from a particular vendor (e.g., Seagate) as well as a particular type or model of storage device from that particular vendor. In this example, there are 4 possible system storage software versions as denoted by 206a-d and there are 3 possible firmware versions for the single storage device type (denoted by Vendor 1 Type 1). Each of the rows 220a-c corresponds, respectively, to information in the database 106 for a combination of the storage device type: vendor 1, type1, and one of the 3 different firmware versions 1-3. For example, row 220a includes information for vendor 1, type1 and firmware version 1; row 220b includes information for vendor 1, type1 and firmware version 2; and row 220c includes information for vendor 1, type1 and firmware version 3.

In connection with analysis performed by the engine 110 described elsewhere herein, processing may be performed which searches the table 200 for a cell or entry of the table 200 in accordance with the current storage software version in the customer's configuration data, and a current firmware version of a current storage device type in the customer's current configuration data (e.g., based on a combination of storage device type 202, firmware version 204 and one of the storage software versions 206a-d).

For a first example, suppose the customer's storage device is vendor 1 type 1 with version 1 firmware and with storage software version 1. In this case, cell or entry 232a corresponds to the current customer configuration information under analysis. The entry 232a is in column 206a for storage software version 1 whereby the analysis may then determine one or more recommended firmware versions for the storage device. In at least one embodiment, the recommended firmware version may be the highest (e.g., latest, most recent or most up to date) firmware version that is compatible with the current storage software version 1 on the customer's data storage system. In such an embodiment, the column 206a may be searched for the highest firmware version that is compatible with the current storage software version 1 on the customer's data storage system. In this example, entry or cell 232c corresponds to the recommended firmware version.

As another second example, suppose the customer storage device type is vendor 1, type 1 with firmware version 1 and with the storage software version 3 (e.g., as denoted by cell or entry 236a of column 206c). In this case as indicated by the latest/most recent compatible firmware version 2 in column 206c, the recommended target storage device firmware version is vendor 1, type 1 with firmware version 2 as denoted by 236b (whereby entry 236b corresponds to the latest compatible and critical firmware version).

As another third example, suppose the customer has vendor 1 type 1 version 1 firmware installed in their storage system with storage software version 2 (e.g., as denoted by cell or entry 234a of column 206b) since the incompatible relationship (between storage version 2 and firmware version 1) was not previously identified. In this case, as indicated by the latest/most recent compatible firmware version 3 in column 206b, the recommended target storage device firmware version needs to be upgraded to firmware version 3 (as denoted by 234c). In this example, the recommended firmware version for upgrade is a normal update rather than a critical update.

As yet another fourth example with reference to FIG. 3, an embodiment in accordance with techniques herein may present the customer with more than one recommended firmware version for upgrade and the customer may then select one of these for which the upgrade is performed. For example, a customer may receive 2 recommended options as will be further illustrated. Suppose the customer has vendor 1 type 1 firmware version 1 installed on their storage system with storage software version 4 (e.g., as denoted by cell or entry 238a of column 206d). In this case, if the latest firmware version 3.0 (238c) is Normal while the prior firmware version 2.0 is Critical (238b), the customer may be presented with two options for recommendation rather than just the highest/most recent compatible firmware version. The user may be required to upgrade to at least the most recent compatible critical firmware version (option 1, 238b). Additionally, the user may also optionally select to further upgrade to a more recent, compatible non-required/normal firmware version 3 (option 2, 238c). In such an embodiment, a user may be presented with the most recent/highest firmware version 2 that is compatible and critical. Additionally, the user may also be presented with an optional recommended upgrade for any other firmware versions subsequent to version 2 the most recent/highest critical, compatible firmware version. As yet a further variation, if column 206d included an entry for firmware version 4.0 that was also compatible and normal with storage software version 4, the user may also be further presented with yet a third option to upgrade to firmware version 4.

Reference is made back to the third example described above where the customer has vendor 1 type 1 version 1 firmware installed in their storage system with storage software version 2 (e.g., as denoted by cell or entry 234a of column 206b). An embodiment may also present the user with multiple recommended firmware upgrade options corresponding to entries 234b firmware version 2 and 234c firmware version 3 since both such options correspond recommended firmware versions for upgrade that are normal rather than critical. As yet a further variation, if column 206b included an entry for firmware version 4.0 that was compatible with storage software version 2 and critical, the user is presented with a single recommended upgrade option to firmware version 4.0 (since it is a critical and thus the most recent required compatible firmware version).

In at least one embodiment, even there is new version available for firmware from a storage device manufacturer, it may be that the new firmware version is incompatible with one or more storage software versions whereby such new firmware version would not be recommended in such incompatible cases. For example, consider a case where the customer has a storage device type of vendor 1 type 1 and storage software version 3 (column 206c). Assume further that the new or latest version of firmware is version 3 which is incompatible with storage software version 3, as denoted by 236c. In this case due to the foregoing incompatibility and consistent with discussion herein, there is no recommendation to upgrade firmware version 3.

Techniques as described herein provide a scalable solution that may be used in connection with multiple data storage systems such as illustrated by 103a-c in FIG. 2. Techniques herein provide for automatic notification to the user or customer such as through proactive background analysis. In at least one embodiment in accordance with techniques herein, when a new firmware version is available, the new firmware may be downloaded as a background operation or task. At a later point in time in connection with other processing as described herein, for example, where the user selects to perform an upgrade, the latest or new firmware version may already be downloaded and is then installed on the desired storage device(s). In at least one embodiment, a user may register each data storage system for which processing herein is to be performed. The user may define a periodic schedule of times (e.g., such as at each occurrence of a defined time interval such as weekly) for which techniques herein are automatically performed for the registered data storage system. At each occurrence of the scheduled time, processing may be performed as described herein for example in connection with FIG. 2 (e.g., to collect configuration data (step 3 above), perform proactive upgrade analysis (step 4 above) and, if appropriate, notify the user regarding a recommended firmware version for upgrade (step 5 above)).

Consistent with discussion herein, the user may define a periodic schedule of times (e.g., such as at each occurrence of a defined time interval such as weekly) for which techniques herein are automatically performed for the registered data storage system. More generally, the occurrence of each such scheduled time may be referred to as a trigger event occurrence that triggers performing processing as described herein. An embodiment may more generally define a set of one or more such trigger events where, when any event of the set occurs causes processing of techniques as described herein. As further examples of trigger events, an embodiment in accordance with techniques herein may include any one or more of the following in the set of defined trigger events: specified time interval or schedule of predetermined times to trigger periodically performing processing described herein; adding or incorporating additional storage devices into a storage system; a user initiated trigger such as using a user interface (e.g., issuing a command or request via a command line interface or through selecting a button or other GUI element from a GUI), and the like.

Figure 4:
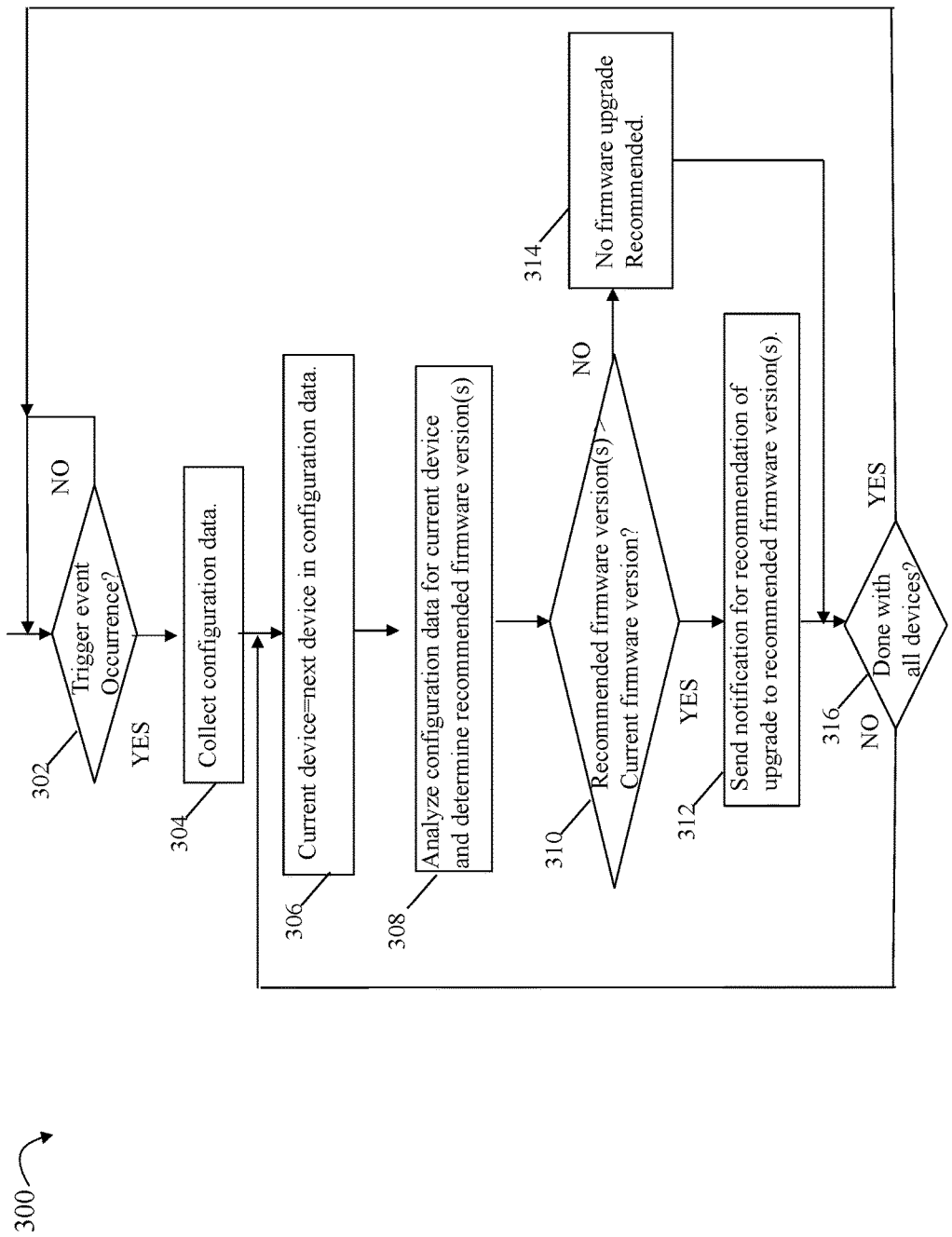
FIG. 4 is a flowchart of processing steps that may be performed in an embodiment in accordance with techniques herein.

Referring to FIG. 4, shown is a flowchart of processing that may be performed in an embodiment in accordance with techniques herein. Flowchart 300 summarizes processing described above. At step 302, a determination is made as to whether a trigger event has occurred. As described above, the trigger event may be an occurrence of one of a defined set of trigger events. In at least one embodiment, the trigger event may be an occurrence of a defined or periodic time interval such as based on a schedule of times at which processing herein may be performed in a proactive manner for proactive firmware upgrades. Control remains at step 302 until step 302 evaluates to yes. Once step 302 evaluates to yes, control proceeds to step 304 where processing is performed to collect configuration data for the current storage system configuration needed for processing using techniques herein. Such configuration data may include the storage device type of each storage device in the data storage system, the current firmware version on each such storage device in the data storage system, and the current version of the storage system software on the data storage system. At step 306, current device is assigned the next storage device in the configuration data (as collected in step 304). At step 308, the configuration data for the current device is analyzed to determine one or more recommended firmware versions for the current device. As described herein, the one or more recommended firmware versions for the storage device may be determined in accordance with the storage device type (e.g., vendor, type or model) of the storage device and the current storage system software version (e.g., operating system, microcode, and the like) on the data storage system. Each such firmware version determined as recommended in step 308 is determined as compatible with the current storage system software version. At step 310, a determination is made as to whether the recommended firmware version is greater than (e.g., later than or more recent than) current firmware version of the storage device. If step 310 evaluates to no, control proceeds to step 314 where it is determined that no firmware upgrade is recommended since the current firmware version is the latest, most recent version. From step 314, control proceeds to step 316. If step 310 evaluates to yes, control proceeds to step 312. At step 312, a notification may be provided to upgrade to the recommended firmware version(s). At step 316, a determination is made as to whether processing of all storage devices (as in the configuration data collected in step 304) is complete. If step 316 evaluates to yes, control proceeds to step 302 to wait for the next trigger event occurrence. It step 316 evaluates to no, control proceeds to step 306 to process the next storage device in the collected configuration data.

As described herein, an embodiment may provide one or more recommended firmware version upgrade options to a user. In at least one embodiment, only a single firmware version for upgrade may be determined. For example, processing as summarized in FIG. 4 may determine the recommended firmware version as the highest or most recent version of firmware that is compatible with the current version of the storage system software. A notification to upgrade to the recommended firmware version may be sent if the recommended firmware version is later or more recent than the current firmware version. As a variation where an embodiment may possibly present the user with multiple recommended upgrade options from which to select, upgrading to at least the latest or most recent compatible critical firmware version may be required. A customer may possibly be presented with one or more other options for upgrade versions if there are additional subsequent firmware versions which are normal (e.g., non-critical or not required). For example, version N may denote the latest or most recent firmware version that is compatible and critical; and version N+1 may denote a firmware version that is normal and compatible and also subsequent to version N. In this case, the user may be presented with two options to upgrade to either firmware version N or firmware version N+1.

Although techniques herein are described with respect to performing an upgrade with respect to firmware of a storage device, more generally, techniques herein may be applicable with other types of suitable upgrade recommendations.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing an upgrade comprising:
receiving, using a processor, notification regarding an occurrence of a trigger event in a system, wherein the trigger event is included in a set of one or more defined trigger events, and wherein the set includes a periodic schedule of times at which first processing is performed that proactively analyzes and determines whether to recommend upgrading firmware of a set of data storage devices including disk drives and solid state drives; and
responsive to receiving the notification, performing, using a processor, the first processing including:
collecting configuration information describing a current configuration of the system, wherein the configuration information includes data storage device information identifying the set of data storage devices including disk drives and solid state drives in the system, a current version of software on the system, and a current version of firmware for a particular type of data storage device in the system, wherein the particular type of data storage device identifies a type of disk drive or solid state drive of the set;
performing proactive analysis of the configuration information that determines whether to recommend performing an upgrade to the firmware for the particular type of data storage device identifying a type of disk drive or solid state drive of the set; and
responsive to determining to recommend performing an upgrade to the firmware for the particular type of data storage device, performing processing including:
receiving a user input indicating to perform a recommended upgrade to the firmware; and
responsive to receiving the user input, performing other processing including upgrading the firmware on the system for the particular type of data storage device to a target version recommended.

2. The method of claim 1, wherein, responsive to determining to recommend performing an upgrade to the firmware, the processing further includes:
providing a user notification regarding the recommended upgrade to the firmware, wherein the user input is received responsive to said providing the user notification.

3. The method of claim 2, wherein the user notification includes information identifying the target version of the firmware recommended for installation on a data storage device of the particular type.

4. The method of claim 1, wherein the system is a data storage system.

5. The method of claim 4, wherein the software on the system includes any of an operating system and microcode installed on the data storage system.

6. The method of claim 5, wherein the proactive analysis of the configuration information further comprises:
determining the target version of the firmware recommended in accordance with the current version of software in the system and the current version of firmware for the particular type of data storage device in the system.

7. The method of claim 6, further comprising:
determining whether the target version of the firmware is a later release than the current version of firmware for the particular type of data storage device in the system; and
if it is determined that the target version is a later release than the current version of firmware for the particular type of data storage device in the system, providing a user notification regarding a recommendation to upgrade the firmware to the target version.

8. The method of claim 5, wherein the proactive analysis of the configuration information further comprises determining a plurality of recommended upgrade options includes a first option and a second option.

9. The method of claim 8, wherein the first option is to upgrade to a first version of the firmware that is compatible with the current version of software in the system and wherein the first version is a critical upgrade of the firmware, wherein the second option is to upgrade to a second version of the firmware that is a later release that the first version of the firmware, wherein the second version is compatible with the current version of software in the system and is a non-critical upgrade of the firmware.

10. The method of claim 9, wherein the current version of firmware is an earlier release of the firmware prior to both the first version of the firmware and the second version of the firmware.

11. The method of claim 9, wherein the first version that is a critical upgrade of the firmware is a required upgrade and includes one or more critical corrections for known problems.

12. The method of claim 9, wherein the second version that is a non-critical upgrade of the firmware is an optional upgrade and includes support for a new feature.

13. The method of claim 12, wherein the new feature includes any of: support for a new processor and support for a power saving enhancement.

14. The method of claim 1, wherein the set of one or more defined trigger events further includes at least one of: adding a storage device to the system, a user initiated trigger using a user interface, issuing a command or request via a command line interface, and selecting a user interface element from a graphical user interface.

15. A system comprising:
at least one processor; and
a memory comprising code stored thereon that, when executed, performs a method of upgrading firmware comprising:
receiving notification regarding an occurrence of a trigger event in a system, wherein the trigger event is included in a set of one or more defined trigger events, and wherein the set includes a periodic schedule of times at which first processing is performed that proactively analyzes and determines whether to recommend upgrading firmware of a set of data storage devices including disk drives and solid state drives; and
responsive to receiving the notification, performing the first processing including:
collecting configuration information describing a current configuration of the system, wherein the configuration information includes data storage device information identifying the set of data storage devices including disk drives and solid state drives in the system, a current version of software on the system, and a current version of firmware for a particular type of data storage device in the system, wherein the particular type of data storage device identifies a type of disk drive or solid state drive of the set;

performing proactive analysis of the configuration information that determines whether to recommend performing an upgrade to the firmware for the particular type of data storage device identifying a type of disk drive or solid state drive of the set; and responsive to determining to recommend performing an upgrade to the firmware for the particular type of data storage device, performing processing including:

receiving a user input indicating to perform a recommended upgrade to the firmware; and responsive to receiving the user input, performing other processing including upgrading the firmware on the system for the particular type of data storage device to a target version recommended.

16. A non-transitory computer readable medium comprising code stored thereon that, when executed, performs a method of upgrading firmware comprising:

receiving notification regarding an occurrence of a trigger event in a system, wherein the trigger event is included in a set of one or more defined trigger events, and wherein the set includes a periodic schedule of times at which first processing is performed that proactively analyzes and determines whether to recommend upgrading firmware of a set of data storage devices including disk drives and solid state drives; and responsive to receiving the notification, performing the first processing including:

collecting configuration information describing a current configuration of the system, wherein the configuration information includes data storage device information identifying the set of data storage devices including disk drives and solid state drives in the system, a current version of software on the system, and a current version of firmware for a particular type of data storage device in the system, wherein the particular type of data storage device identifies a type of disk drive or solid state drive of the set;

performing proactive analysis of the configuration information that determines whether to recommend performing an upgrade to the firmware for the particular type of data storage device identifying a type of disk drive or solid state drive of the set; and responsive to determining to recommend performing an upgrade to the firmware for the particular type of data storage device, performing processing including:

receiving a user input indicating to perform a recommended upgrade to the firmware; and responsive to receiving the user input, performing other processing including upgrading the firmware on the system for the particular type of data storage device to a target version recommended.

17. The non-transitory computer readable medium of claim 16, wherein, if it is determined to recommend performing an upgrade to the firmware, the method further includes:

providing a user notification regarding the recommended upgrade to the firmware, wherein the user input is received responsive to said providing the user notification.

18. The non-transitory computer readable medium of claim 17, wherein the user notification includes information identifying the target version of the firmware recommended for installation on a data storage device of the particular type.

* * * * *